No. 691,181. Patented Jan. 14, 1902.
G. W. ROWSE.
BRAKE MECHANISM FOR COIN CONTROLLED APPARATUS.
(Application filed June 15, 1901.)
(No Model.) 5 Sheets—Sheet 3.

WITNESSES.
Charles T. Hannigan
Joseph R. Bullock Jr.

INVENTOR.
George W. Rowse
By Warren R. Perce
Atty.

No. 691,181. Patented Jan. 14, 1902.
G. W. ROWSE.
BRAKE MECHANISM FOR COIN CONTROLLED APPARATUS.
(Application filed June 15, 1901.)
(No Model.) 5 Sheets—Sheet 4.

WITNESSES.
Charles T. Hannigan
Joseph R. Bullock Jr.

INVENTOR.
George W. Rowse
By Warren R. Perce
Atty.

No. 691,181. Patented Jan. 14, 1902.
G. W. ROWSE.
BRAKE MECHANISM FOR COIN CONTROLLED APPARATUS.
(Application filed June 15, 1901.)
(No Model.) 5 Sheets—Sheet 5.

WITNESSES.
Charles T. Hannigan.
Joseph R. Bullock Jr.

INVENTOR.
George W. Rowse
By Warren R. Peace
Atty.

UNITED STATES PATENT OFFICE.

GEORGE W. ROWSE, OF PAWTUCKET, RHODE ISLAND, ASSIGNOR OF ONE-HALF TO WALTER H. CROWNINSHIELD AND CHARLES H. LAWTON, OF PAWTUCKET, RHODE ISLAND.

BRAKE MECHANISM FOR COIN-CONTROLLED APPARATUS.

SPECIFICATION forming part of Letters Patent No. 691,181, dated January 14, 1902.

Application filed June 15, 1901. Serial No. 64,674. (No model.)

*To all whom it may concern:*

Be it known that I, GEORGE W. ROWSE, a citizen of the United States, residing at Pawtucket, in the county of Providence and State of Rhode Island, have invented certain new and useful Improvements in Brake Mechanism for Coin-Controlled Apparatus, of which the following is a specification, reference being had therein to the accompanying drawings.

Like numerals indicate like parts.

My invention relates to brake mechanism for coin-controlled apparatus; and it consists of the novel construction and combination of the several element hereinafter particularly described and as specifically set forth in the claims.

Figures 7, 8, 9:
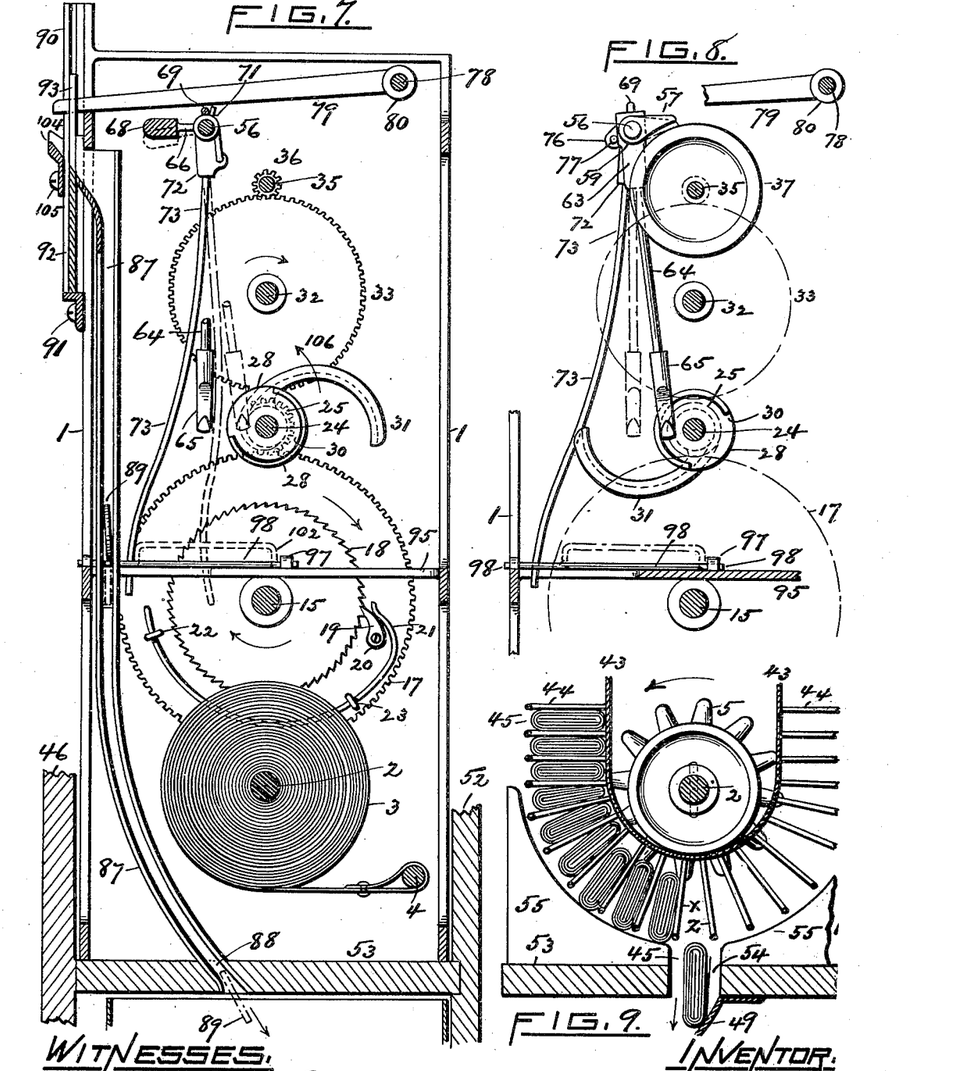
Fig. 7 is a view of said mechanism, partly in side elevation and partly in vertical section, as seen on line *d d* of Fig. 1.
Fig. 8 is a view of certain portions of said mechanism, partly in side elevation and partly in vertical section, as seen on line *e e* of Fig. 2.
Fig. 9 is a view of certain portions of a vending-machine provided with a brake mechanism and coin-controlled means for operating the same, partly in side elevation and partly in section, as seen on line *f f* of Fig. 1, and shows the packages in position in the racks and one package as being delivered.

In the drawings, 1 represents the frame of the machine, by which the other parts are supported in position. The main shaft is shown at 2, and upon it is wound the mainspring 3, whose end, bent into a loop and riveted, is fastened to a rod 4, as seen in Fig. 7. On the main shaft 2 is fastened two sprocket-wheels 5 and also two gears 6 and 7. (See Figs. 1, 3, 4, and 9.)

On a shaft 8, which is mounted in the frame 1, is a gear 9. A crank-handle 10 by its tubular barrel 11 fits upon said end of the shaft 8 and is fastened thereon in any suitable manner. The shaft 8, with the gear 9 thereon, is rotatable by the crank-handle 10, Figs. 1 and 6.

On a shaft 13, which is mounted in the frame 1, is a gear 14, meshing with the gears 7 and 9 and communicating motion from the gear 9 to the gear 7 whenever the shaft 8 is turned by the handle 10. In this manner the turning of the handle 10 results in the rotation of the main shaft 2 and the consequent winding of the mainspring 3 upon the main shaft 2.

On a shaft 15, which is mounted in the frame 1, is a gear 16, engaging with the gear 6 of the main shaft 2. The shaft 15 also has the gear 17 and the ratchet-gear 18 upon it, and a pawl 19, pivotally mounted at 20 on the gear 17, is engageable with the ratchet-gear 18 and is held in such engagement by the spring 21, which, being mounted in the loops 22 23 on the gear 17, has its free end bearing against the pawl 19, Figs. 1, 4, and 7.

On a shaft 24, which is mounted in the frame 1, are a pinion 25, a gear 26, a circumferentially-grooved wheel 27, and two circular disks 28 29. Said disks are a little distance apart, and on the edge of each of them is an inwardly-directed flange 30, extending about two hundred and thirty degrees. On said shaft 24 is also fastened a curved cam-arm 31, which has a peripheral groove, Figs. 3, 7, and 8. The pinion 25 derives motion from the gear 17 of the shaft 15, with which gear it meshes, Figs. 1 and 7.

On a shaft 32, which is mounted in the frame 1, are a gear 33 and a pinion 34, the latter of which is in mesh with the gear 26 of the shaft 24, (see Fig. 3,) the shaft 32 being shown as broken away in order to see the underlying parts.

On the shaft 35, mounted in the frame 1, are a pinion 36 and a balance-wheel 37, said pinion meshing with the gear 33 of the shaft 32, Figs. 1, 2, 7, and 8.

Figure 10:
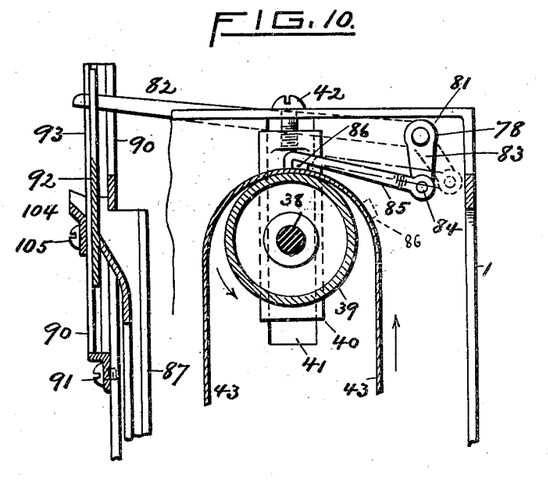
Fig. 10 is a view of certain portions of said machine, partly in side elevation and partly in section, as seen on line *g g* of Fig. 2.

On the shaft 38 are mounted the two upper sprocket-wheels 39. As seen in Fig. 10, the shaft 38 is mounted in flanged sliding blocks 40, which are vertically movable in slots 41 of the frame 1 and are adjustable in position by means of the screws 42.

Two flexible metallic bands 43 43 (made, preferably, of German silver) pass around the sprocket-wheels 5 5 39 39 and are drawn tight by means of the adjusting-screws 42 and the sliding blocks 40, upon which blocks the shaft 38 is mounted. A number of equispaced rack bars or wires 44, having bent ends, are secured to said bands 43 43 and extend radially and parallel with each other, as shown. These bands 43 are sprocket-bands having each a series of holes, with which the teeth of the sprocket-wheels, respectively, are engageable, as shown.

The packages or merchandise to be delivered by this machine are shown at 45, and said packages 45 are inserted between the contiguous racks 44. (See Fig. 9.)

Figure 5:
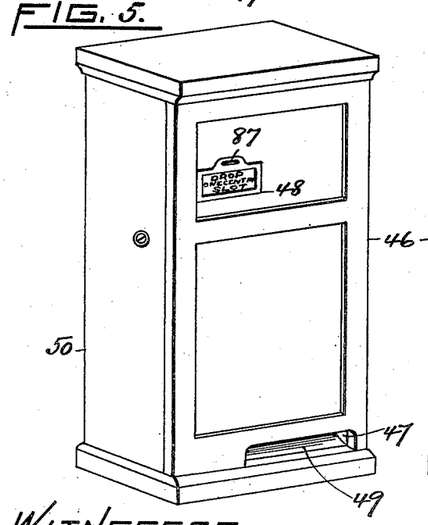
Fig. 5 is a perspective view, on a reduced scale, of the case inclosing the operative parts of the mechanism as seen when the device is in working order.
Figure 6:
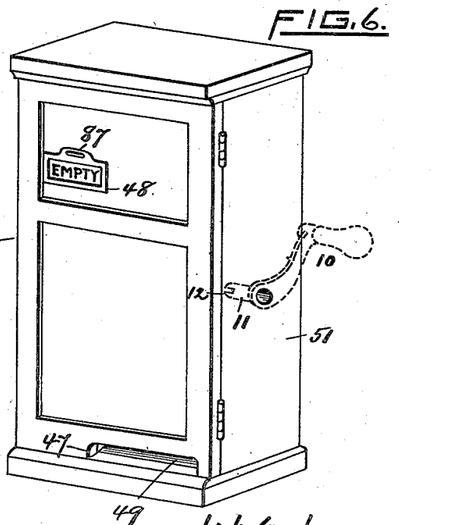
Fig. 6 is a similar perspective view of the case as seen when the device is not in working order.

The case inclosing the machine is shown in Figs. 5 and 6. It is provided with a hinged door 46, having an opening or aperture 47 at the bottom thereof and also an aperture or opening 48 near the upper left-hand corner. A bent curved sheet or chute 49 within the case has its lower end terminate in the lower opening or aperture 47 of the door 46. The case has the sides 50 51, the back 52, and bottom 53, the latter being made, as shown in Fig. 9, with a slot or opening 54, and on the bottom 53 of said case are fastened the two blocks 55, having concaved upper surfaces and extending to the edges of the slot 54 and serving to support the packages 45 until they respectively come into position vertically above the slot 54, whence they are discharged one at a time, as indicated in Fig. 9.

Figures 11, 12:
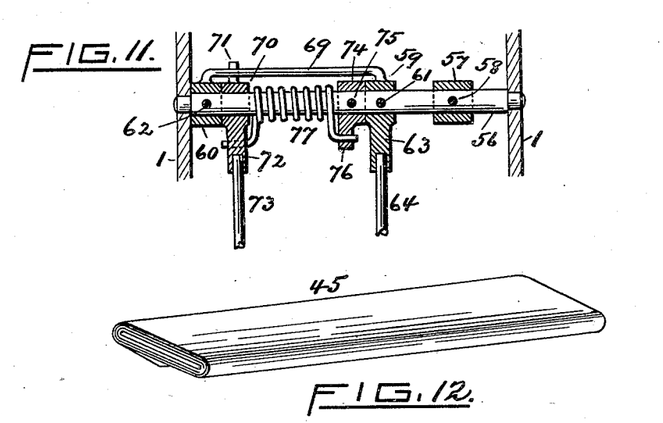
Fig. 11 is detail view.
Fig. 12 is a perspective view of the article vended.

The shaft 56 is mounted on the frame 1, as shown in detail in Fig. 11. The brake-shoe or friction-arm 57 is mounted on the shaft 56 and fastened thereto by a pin 58 or in any other suitable manner. Two tubular sleeves 59 and 60 are also mounted on the shaft 56 and are fastened thereon by the pins 61 and 62, respectively, or by other proper means. Integral with the tubular sleeve 59 is the arm 63. A brake-rod 64 is screwed in or otherwise secured to the arm 63, and an inverted-T-shaped piece 65 is fastened to the end of the rod 64, the length of the cross-arm of said piece 65 being such that it is adapted to enter between the disks 28 29, in the unflanged part thereof, (see Fig. 3,) but to be engaged by the flanges of said disks when the parts are in the position illustrated in Fig. 8.

Integral with the tubular sleeve 60 is the arm 66, and integral with the brake arm or shoe 57 is the arm 67. A bar 68, serving as a weight or counterpoise, extends from the arm 66 to the arm 67 and is integral therewith. A bar or loop 69 extends between the tubular sleeves 59 and 60 and is fastened thereto at its ends, respectively.

A tubular sleeve 70 is loosely mounted on the shaft 56 and has extending therefrom a pin 71 and also an integral arm 72. A rigid wire or rod 73 is screwed or otherwise fastened to the lower end of the arm 72 and is curved and shaped as shown in Figs. 7 and 8. A tubular sleeve 74 is mounted on the shaft 56 and fastened thereon by a pin 75. The sleeve 74 has a short integral arm 76. A spiral spring 77 surrounds the shaft 56 and has its ends bent at an angle, one end passing through a hole in the arm 72 and the other inserted in a hole in the arm 76, Figs. 2, 8, and 11.

A shaft 78 is mounted on the frame 1. A lever-arm 79 has a tubular sleeve 80, by which it is loosely mounted on the shaft 78. A tubular sleeve 81 is loosely mounted on the shaft 78 and has extending therefrom the lever-arm 82 and also the crank-arm 83. On the lower end of the crank-arm 83 is pivotally mounted at 84 the pawl 85, having its free end bent at an angle. A block or knob 86 is fastened on the inner sprocket-band 43, and the end of the pawl 85 is engageable therewith.

The coin-chute is seen at 87, having its upper open end extending angularly and its lower portion curved, as shown, and passing through an angular aperture 88 through the bottom. The coin to actuate the mechanism is represented at 89.

Two vertical parallel ways or guides 90 are fastened to the frame 1 by the screws 91, and a slide 92 is mounted movably therein. Said slide 92 has two parallel uprights 93 94, which are slotted, and in the slots of said uprights, respectively, are inserted the forward ends of the lever-arms 79 and 82.

Figure 3:
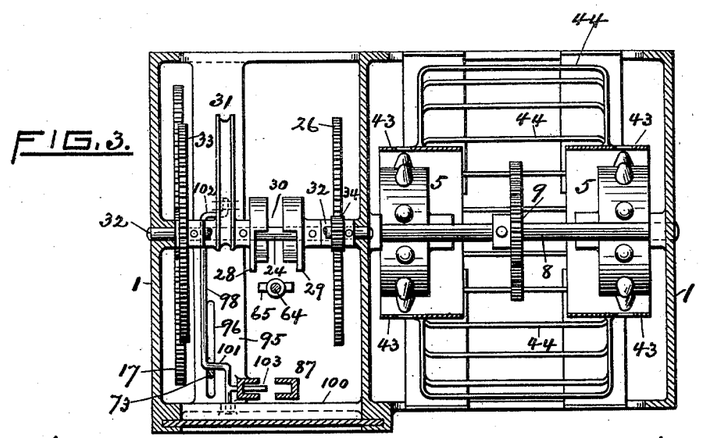
Fig. 3 is a view of said mechanism as seen on line *b b* of Fig. 1.
Figure 4:
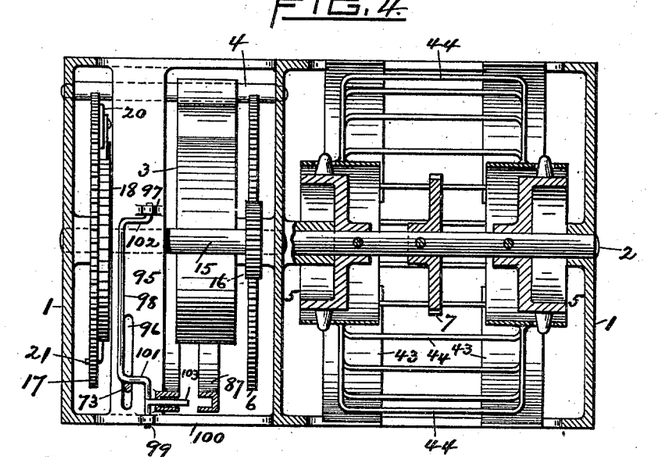
Fig. 4 is a view of said mechanism as seen on line *c c* of Fig. 1.

A cross-bar 95 extends from the front to the rear frame and is provided with a slot 96 and with an earpiece 97. A detent-wire 98 is mounted loosely by its two ends, as shown in Fig. 4, one in said earpiece 97 and the other in an earpiece 99 of the cross-bar 100. (See Figs. 3 and 4.) The detent-wire 98 has two right-angled bends 101 102 and is provided with a tripping-arm 103, extending at a right angle and entering the coin-chute 87, as shown in Figs. 3 and 4.

A lip 104 is fastened to the frame 1 by the screws 105 and is the external continuation of the upper angular end of the coin-chute 87.

Having thus described the different parts of my device and their construction, I will now explain the operation.

Figure 1:
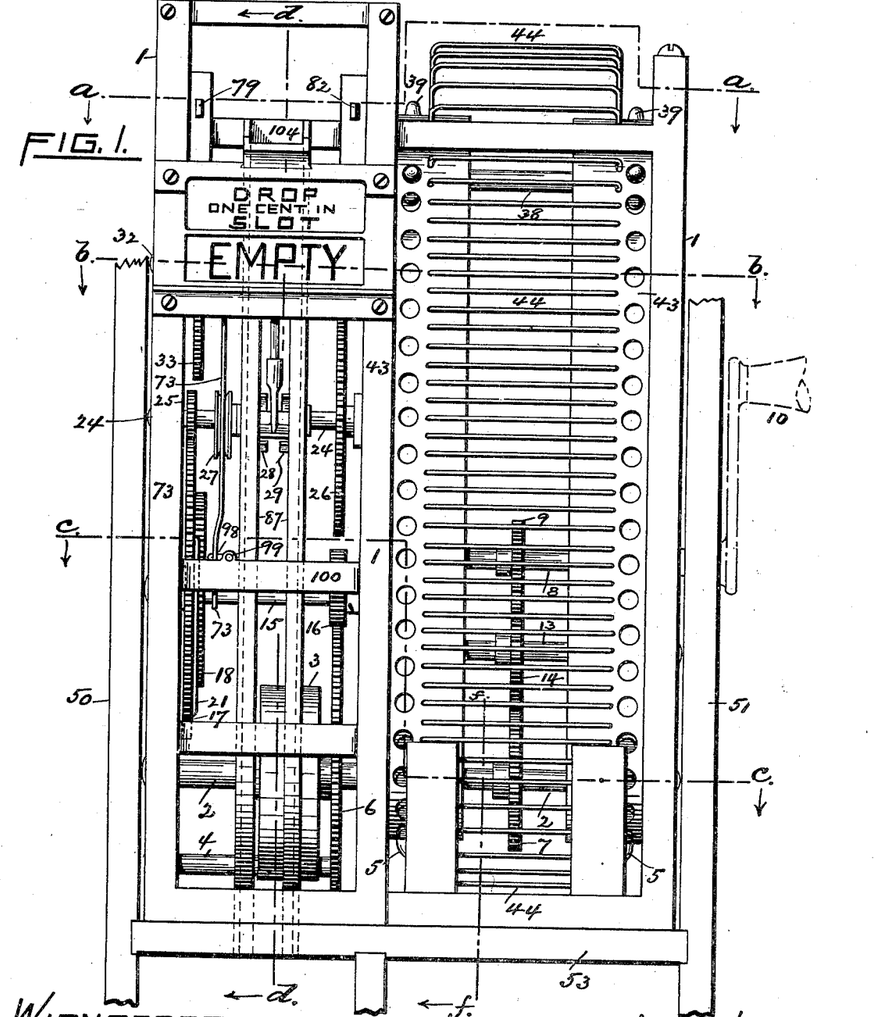
Figure 1 is a front elevation of my improved brake mechanism for coin-controlled apparatus as applied to vending-machines.
Figure 2:
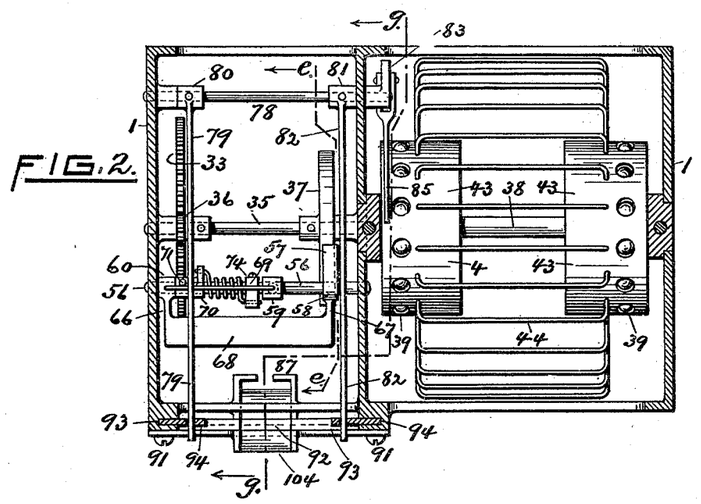
Fig. 2 is a top plan view of the same as seen on line *a a* of Fig. 1.

The packages 45, which are to be delivered by machine when operated, are placed between the wire racks 44 of the two metallic sprocket-bands 43 in the manner indicated in Fig. 9. A coin 89 is placed upon the external lip 104 of the coin-chute 87 and passes through the chute by gravity. When the coin 89 is in the position indicated by solid lines in Fig. 7, it comes in contact with the arm 103, which extends from the detent-wire 98, and by its weight in falling it depresses the outer end of the arm 103 of said detent, thereby turning the detent-wire 98 from the position shown in solid lines in Figs. 7 and 3 (where said wire is seen extended in a horizontal plane) to the position shown in Fig. 7 in dotted lines. Now when the machine is not working the rod 73 is in the position indicated in solid lines in Figs. 3, 4, and 7, where it is seen that the lower end of said rod lies in front of the forward bend 101 of the detent-wire 98. When the rod 73 is in this position and held therein by the detent-wire 98, it presses against said bend 101 of the detent-wire because of the tension of the spiral spring 77, one of whose ends is inserted in the arm 72 of the loose tubular sleeve 70 on the shaft 56 and the other of whose ends is inserted in the arm 76 of the tubular sleeve 74, which is fastened by the pin 75 on the shaft 56. As soon, therefore, as the coin 89 in passing down through the chute 87 has depressed the arm 103 of the detent-wire 98, as already described, thus turning the detent-wire 98 into the position shown by dotted lines in Fig. 7, said detent-wire 98 can no longer confine the rod 73 to the position indicated by solid lines in said figure, and said rod 73 by force of the spiral spring 77, then free to act, moves along the slot 96 of the cross-bar 95 to the position shown in Fig. 7 in dotted lines, and as the brake-rod 64 is arranged to be in a plane slightly to the rear of the rod 73 said brake-rod 64 moves from the position shown in solid lines in Figs. 1, 3, and 7 and in dotted lines in Fig. 8 to the position shown in dotted lines in Fig. 7. At the time of this movement of the brake-rod 64 the relative position of the disks 28 29 is as shown in Figs. 1, 3, and 7—that is to say, directly in front of the unflanged portions of said disks—so that when the brake-rod 64 moves back by force of the spring 77 it is able to enter between said disks 28 and 29 at the unflanged portion thereof, the cross-arm of the piece 65 then being in the position indicated by dotted lines in Fig. 7. As is apparent from an examination of Figs. 7 and 8, when the brake-rod 64 is in the position shown in solid lines in Figs. 1, 3, and 7 the brake shoe or arm 57 is in contact with the periphery of the wheel 37 and held forcibly thereon by means of the spring 77, which forcible engagement of the brake-shoe 57 with the wheel 37 prevents the rotation of the whole train of gearing and counteracts the power of the mainspring 3; but when the brake-rod 64 is in the position shown in dotted lines in Fig. 7 and in solid lines in Fig. 8 the brake-shoe 57 is lifted from the wheel 37, being so lifted by the weight 68. Now when the brake-shoe 57 is disengaged from its frictional contact and pressure upon the wheel 37 the train of gearing rotates by force of the mainspring 3, thus turning the disks 28 29 from the position shown in Fig. 7 to a position in which the flanges 30 of said disks 28 29 overlie the ends of the cross-arm of the piece 65, as in Fig. 8. The rotation of the shaft 24, caused by the rotating gearing, moves the curved cam-arm 31 in the direction of the arrow 106, Fig. 7. When the cam-arm 31 comes in contact with the rod 73, then being within the peripheral groove of said cam-arm, the rod is moved thereby from the position shown in dotted lines in Fig. 7 to the position shown in solid lines in Fig. 8. During this movement the detent-wire 98 has remained in the elevated position indicated in Fig. 7 by dotted lines and the rod 73 moves in the slot 96 toward the front and slides along the detent-wire 98, with which it is in contact; but as soon as the rod 73 in this movement comes into line with and passes the bend 101 of the detent-wire 98 said detent-wire 98 falls by its weight into its former horizontal position, so that when the curved cam-arm 31 has cleared the rod 73 said rod 73 by force of the spring 77 moves from the position shown in Fig. 8 to the position shown in solid lines in Figs. 1, 3, 4, and 7 and then presses against and is held from further rearward movement by the bend 101 of said detent-wire 98; but during all the time the rod 73 is moving forward by the pressure of the curved cam-arm 31 from the position shown in dotted lines in Fig. 7 to the position shown in solid lines in Fig 8 the brake-rod 64 has been prevented from any forward movement, because the circular flanges 30 of the disks 28 29 engage the cross-arm of the piece 65 on the end of the brake-rod 64, and said rod during said time is immovable because the flanges 30 are in the arcs of true circles; but as soon as the unflanged portion of the disks 28 29 rotate into the positions shown in Figs. 1, 3, and 7 the cross-arm of the piece 65 is disengaged and carried toward the front of the machine by force of the spiral spring 77 to the position shown in solid lines in Fig. 7. While the brake-rod 64 is thus held from movement, the rod 56 cannot rotate, because said rod 64 is fastened thereto by the pin 61; but the sleeve and arm 70 72 are free to be moved by the rod 73, connected therewith, and the result is that the spiral spring 77 is wound tighter. The purpose of the bar 69, which extends between the sleeves 59 60 and the pin 71, is that by the contact of said pin with said bar the rearward movement of the rod 73 is limited. The counterpoise or weight 68 serves to automatically lift the brake-shoe 57 from its pressure and contact on the balance-wheel 37 when the spiral spring 77 is not under tension. The extent of the movement of the weight or counterpoise 68 is indicated by dotted lines in Fig. 7. The gearing is so calculated and timed that during the time while the rod 73 is moving from its position shown in solid lines in Fig. 7 to the position shown in dotted lines in said figure and back again to its position shown in solid lines in said figure the lowermost rack-wire of the sprocket-bands 43 moves from the position marked x in Fig. 9 to the position marked z in said figure. The package 45 then lowermost, being no longer supported, falls through the slot 54 of the bottom 53 of the case and is directed by the chute 49 out through the aperture 47 of the door 46. On one of the sprocket-bands 43 is fastened the block or knob 86. Once in every complete circuit of the sprocket-bands 43 around the sprocket-wheels 5 5 39 39 the block 86 comes into contact with the inner surface of the bent end of the pawl 85. The next progressive movement of the sprocket-bands 43, caused by the mainspring 3 and the intermediate gearing and sprocket-wheels, moves said block 86 from the position shown in dotted lines in Fig. 10 to the position shown in solid lines in said figure, thereby drawing the pawl 85 from the position shown in dotted lines in said Fig. 10 to the position shown in solid lines in said figure. This movement causes the lever-arms 79 and 82 to rise from the position shown in Figs. 1, 2, and 7 to the position shown in Fig. 10. This rise of the lever-arms 79 and 82 causes the rise of the slide 92, so that the portion thereof marked with the words "Drop one cent in the slot," which while the machine is in operative condition to deliver packages appears through the aperture 48 of the door 46, is drawn up in the guideways 90 away above the said aperture 48 and that portion of the slide 92 which is marked with the word "Empty" appears at said aperture. When the slide 92 has so moved upward, the upper part of said slide covers the open upper end of the coin-chute 87 behind the chute-lip 104, so that a coin cannot be put into the chute 87. If when the racks 44 of the sprocket-bands 43 are all provided with packages 45 the block 86 is just in advance of the pawl 85, the machine will deliver its last package 45 just in time to allow said rise of the slide 92 to prevent the insertion of any more coins until the machine is provided with a new supply of packages 45. The descent of the slide 92 in the guideways 90 is caused by its weight and takes place whenever the block 86 has moved forward out of engagement with the end of the pawl 85.

The vending-machine which I have shown in the drawings and hereinbefore specified as connected with and actuated by the coin-controlled apparatus and the brake mechanism thereof I do not claim in this application, but reserve the same as the subject-matter of a future application by me for Letters Patent.

I claim as a novel and useful invention and desire to secure by Letters Patent—

1. In a brake mechanism for coin-controlled apparatus, the combination of a frame, a main shaft supported by said frame, a mainspring wound on said main shaft, means for winding said spring, an upper shaft supported by said frame, a train of gearing properly mounted and engaged, adapted to communicate rotary motion from the main shaft to said upper shaft, a balance-wheel fastened upon the second-named shaft, a third shaft supported in said frame, a brake-shoe mounted on said third shaft and extending over and in frictional contact with the periphery of said balance-wheel, means adapted to automatically lift said brake-shoe from the balance-wheel, a spiral spring on said third shaft adapted to press the brake-shoe against the periphery of the balance-wheel, a downwardly-extending rod connected with said brake mechanism and capable of an oscillating movement and adapted to increase the tension of said spiral spring, means of oscillating said rod for the purpose of increasing the tension of said spiral spring, a coin-chute, and a tilting detent-wire properly mounted and capable, when horizontal, of holding said rod in position and having a portion thereof extending into the coin-chute and so arranged as to be depressed by the weight of a coin moving by gravity down said coin-chute, substantially as specified.

2. In a brake mechanism for coin-controlled apparatus, the combination of a frame, a main shaft supported by said frame, a mainspring wound on said main shaft, means for winding said spring, a second shaft supported by said frame, a train of gearing properly mounted and engaged, adapted to communicate rotary motion from the main shaft to the second shaft, a balance-wheel upon said second shaft, a third shaft supported in said frame, a brake-shoe mounted on said third shaft and extending over and in frictional contact with said balance-wheel, a weight or counterpoise adapted to automatically lift said brake-shoe from said balance-wheel, a spiral spring on said third shaft adapted to press said brake-shoe against the balance-wheel, a downwardly-extending oscillating rod mounted on the said third shaft and adapted to increase the tension of said spiral spring when oscillated in an outward direction, a fourth shaft supported in said frame and having a gear in mesh with a gear of the said train of gearing and also having a curved cam-arm provided with a peripheral groove and adapted thereby to receive said rod, a coin-chute, a tilting detent-wire properly mounted and capable, when horizontal, of holding said rod in position and having a portion thereof extending into the coin-chute and so arranged as to be depressed by the weight of a coin moving by gravity down said coin-chute, substantially as described.

3. In a brake mechanism for coin-controlled apparatus, the combination of a frame, a main shaft supported by said frame, a mainspring wound on said main shaft, means for winding said spring, a second shaft supported by said frame, a train of gearing properly mounted and engaged, adapted to communicate rotary motion from the main shaft to the second shaft, a balance-wheel upon said second shaft, a third shaft supported by said frame, a brake-shoe mounted on said third shaft and extending over and in frictional contact with said balance-wheel, a weight or counterpoise adapted to automatically lift said brake-shoe from said balance-wheel, a spiral spring on said third shaft and adapted to press the brake-shoe against the balance-wheel, a downwardly-extending oscillating rod mounted on said third shaft and adapted to increase the tension of said spiral spring, when oscillated in an outward direction, a fourth shaft supported by said frame and having a gear in mesh with a gear of the said train of gearing and also having a curved cam-arm provided with a peripheral groove and adapted thereby to receive said rod, a coin-chute, and means actuated by a coin moving in said chute by gravity and adapted to hold said rod at the limit of its outward oscillation, substantially as shown.

4. In a brake mechanism for coin-controlled apparatus, the combination of a frame, a main shaft supported by the frame, a mainspring wound on the main shaft, means for winding said spring, a second shaft supported by the frame, a train of gearing properly mounted and engaged and adapted to communicate rotary motion from said main shaft to the second shaft, a balance-wheel upon said second shaft, a third shaft supported by said frame, a brake-shoe mounted on said third shaft and extending over and in frictional contact with said balance-wheel a weight or counterpoise adapted to automatically lift said brake-shoe from said balance-wheel, a spiral spring on said third shaft adapted to press said brake-shoe against the balance-wheel, a downwardly-extending oscillating rod mounted on said third shaft and adapted to increase the tension of said spiral spring, when oscillated in an outward direction, a fourth shaft supported by said frame and having a gear in mesh with a gear of said train of gearing and also having two parallel disks mounted therein and each provided with an inwardly-directed arc-shaped flange, a brake-rod fastened at its upper end on said third shaft and having at its lower end a piece shaped like an inverted T with the cross-arm thereof adapted and arranged to enter between said disks through the unflanged portion thereof but capable of engagement with the flanged portion thereof, means adapted to impart an outward movement to said oscillating rod, a coin-chute, and a detent arranged to automatically hold said oscillating rod at the limit of its outward movement and to be tripped by a coin falling by gravity through said chutes, substantially as described.

5. In a brake mechanism for coin-controlled apparatus, the combination of a frame, a main shaft supported by said frame, a mainspring wound on said main shaft, means for winding said spring, a second shaft supported by said frame, a train of gearing properly supported and engaged, adapted to communicate rotary movement from the main shaft to the second shaft, a balance-wheel upon said second shaft, a third shaft supported by said frame, a brake-shoe mounted on said third shaft and extending over and in frictional contact with said balance-wheel, a weight or counterpoise adapted to automatically lift said brake-shoe from said balance-wheel, a spiral spring on said third shaft adapted to press said brake-shoe against the balance-wheel, a downwardly-extending oscillating rod mounted on said third shaft and adapted to increase the tension of said spiral spring when oscillated in an outward direction, a fourth shaft supported by said frame and having a gear in mesh with a gear of said train of gearing and also having a curved cam-arm provided with a peripheral groove and adapted thereby to receive said rod, a coin-chute, a tilting detent-wire properly mounted and capable when horizontal of holding said rod in position at the outward limit of its oscillation and having a portion thereof extending into the coin-chute and so arranged as to be depressed by the weight of a coin moving by gravity down said coin-chute, two parallel disks mounted on said fourth shaft and each provided with an inwardly-directed arc-shaped flange, and a brake-rod fastened at its upper end on said third shaft and having at its lower end a piece shaped like an inverted T with the cross-arm thereof adapted and arranged to enter between said disks through the unflanged portion thereof but capable of engagement with the flanged portion thereof, all arranged and operating substantially as and for the purpose specified.

6. In a brake mechanism for coin-controlled apparatus, the combination of a mainspring, a train of gearing, a balance-wheel mounted on one of the shafts of said train of gearing, a brake-shaft properly supported and having fastened thereon a brake-shoe extending over and in frictional contact with the rim of said wheel, a brake-rod mounted and fastened at its upper end upon the brake-shaft, an arm mounted and fastened on the brake-shaft, a sleeve mounted and fastened on the brake-shaft, a rod bent at its two ends and extending from said sleeve to the upper end of the brake-rod, an oscillating rod loosely mounted on the brake-shaft and having a pin projecting from its upper end adapted as a stop-pin to limit the inward oscillation of said oscillating rod, a spiral spring surrounding the brake-shaft and having its ends bent, one of which ends is fastened in the head of the oscillating rod beneath said brake-shaft and the other of which ends is fastened in said arm, means adapted to move said oscillating rod in an outward direction and thereby to increase the tension of said spring, means adapted to detain said oscillating rod at the limit of its outward movement, a tripping device adapted to release the oscillating rod from said detaining means, and means adapted to confine said brake-rod from outward movement while the oscillating rod is moving outwardly but to disengage said brake-rod when the oscillating rod is detained as aforesaid, substantially as shown and for the purpose specified.

In testimony whereof I affix my signature in presence of two witnesses.

GEORGE W. ROWSE.

Witnesses:
WARREN R. PERCE,
JOSEPH R. BULLOCK, Jr.